United States Patent [19]
Höffken et al.

[11] 3,913,950
[45] Oct. 21, 1975

[54] VACUUM VESSEL SEALING ARRANGEMENT

[75] Inventors: Erich Höffken, Dinslaken; Dieter Pflipsen, Rheinkamp-Baerl; Hansjörg Trenkler, Dinslaken-Hiesfeld, all of Germany

[73] Assignee: Vacmetal Gesellschaft fur Vakuum-Metallurgie mbH, Dortmund, Germany

[22] Filed: Jan. 24, 1974

[21] Appl. No.: 436,208

[30] Foreign Application Priority Data
Feb. 1, 1973 Germany............................ 7303698

[52] U.S. Cl. .................. 285/55; 285/286; 285/363; 285/416
[51] Int. Cl.² .......................................... F16L 9/14
[58] Field of Search ............ 285/286, 340, 55, 416, 285/DIG. 18, 363, 405; 277/236

[56] References Cited
UNITED STATES PATENTS

| | | | |
|---|---|---|---|
| 2,684,255 | 7/1954 | Abele et al...................... | 285/286 R |
| 3,311,392 | 3/1967 | Buschow........................ | 285/286 X |
| 3,369,826 | 2/1968 | Boosey et al. ................. | 285/286 X |
| 3,575,445 | 4/1971 | French............................. | 285/55 |
| 3,583,064 | 6/1971 | Costello et al................. | 285/286 X |

Primary Examiner—Dave W. Arola
Attorney, Agent, or Firm—Toren, McGeady and Stanger

[57] ABSTRACT

A refractory-lined vacuum vessel for use in metallurgical processes has a refractory lined feed pipe connected to it for the passage of molten metal into and out of the vessel. The connection comprises a flange which projects radially from the end of the feed pipe and which is connected by bolts to a similar flange at the adjacent end of a short refractory lined lead-in pipe of the vacuum vessel. The refractory linings of the lead-in and feed pipes project beyond their flanges so that when the connection is made the pipe linings abut each other while the flanges are axially spaced apart. This spacing is sealed in a vacuum tight manner by a pair of frustoconical sheet metal rings which are welded to each other at their outer edges and are welded at their inner edges one to the flange of the vacuum vessel and the other to the flange of the feed pipe. The vacuum tight seal formed by the welded rings possesses slight freedom of movement in an axial direction which allows the flange bolts to be tightened to ensure that the ends of the refractory linings tightly abut each other to prevent molten metal from escaping.

5 Claims, 1 Drawing Figure

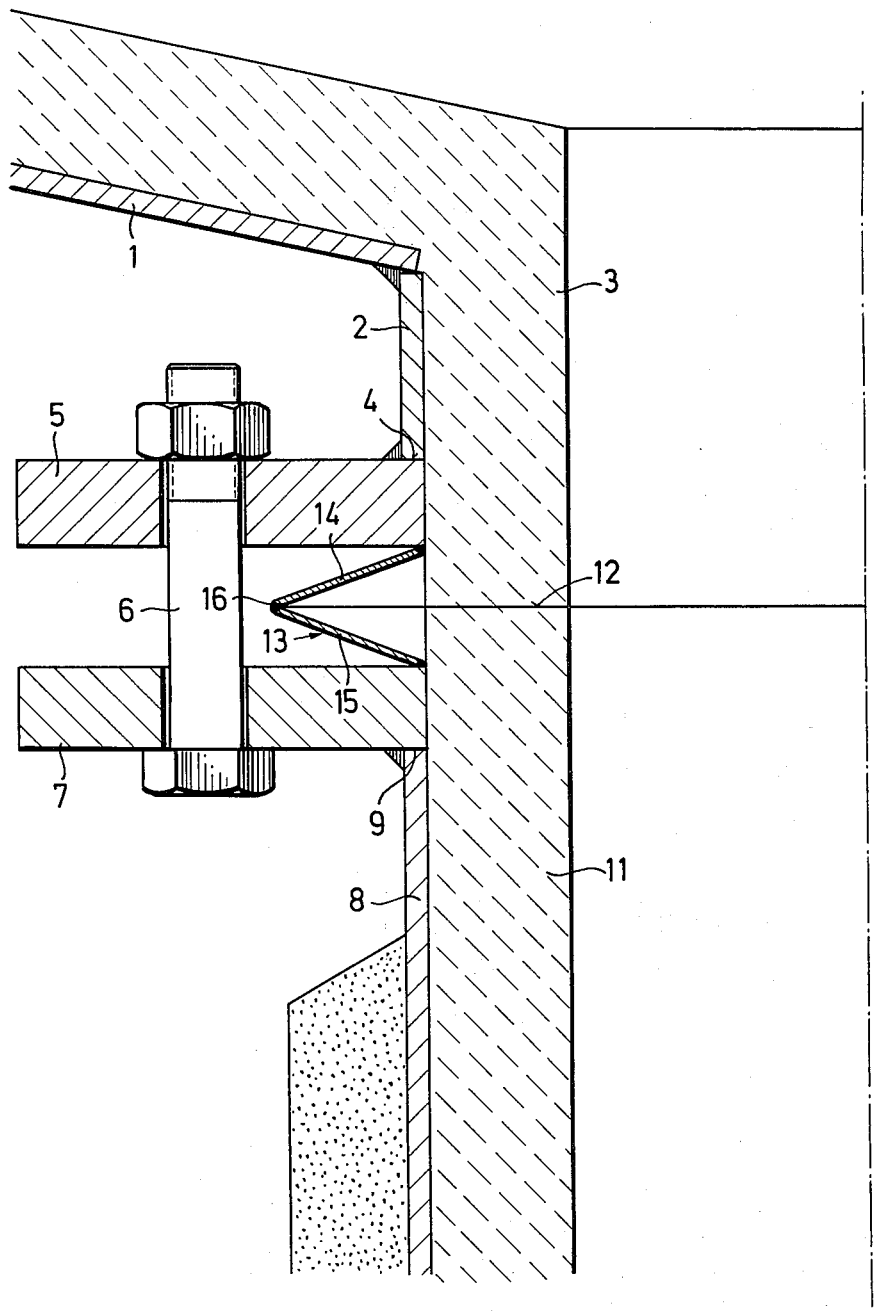

VACUUM VESSEL SEALING ARRANGEMENT

The invention relates to the connection between a vacuum vessel for use in metallurgical processes and a refractory lined feed pipe for the vessel.

In vacuum metallurgy a refractory-lined feed pipe is used to enable molten metal to flow into and out of the vacuum vessel which is usually mounted above the smelt which is to be de-gassed or otherwise treated in the vessel. Since under operating conditions a pressure of less than 10 torr commonly obtains inside this vessel, compared with a normal external or atmospheric pressure of 760 torr, the connection between the refractory-lined feed pipe and the vessel must be completely vacuum tight. Any air entering the vessel through the connection would spoil the metallurgical treatment and would also lead to premature wear of the refractory lining in the vicinity of the actual joint between the vessel and the feed pipe lining. This joint should also be very tight, sufficient to prevent it from being washed out by the passage of molten metal through the feed pipe which would then result in very rapid destruction of the connection.

The aim of the present invention is to provide a connection between a vacuum vessel and its feed pipe which has a vacuum tight seal and which enables the joint between the refractory linings of the pipe and the vessel to be made tight to prevent destruction of the seal by the molton metal which passes through the pipe during operation of the vessel.

According to the invention a vacuum vessel for metallurgical use is connected to a refractory lined feed pipe for the passage of molten metal into and out of the vessel by a joint which is sealed by a pair of rings which are attached in a vacuum tight manner at adjacent edges to each other and at their other edges one to the vessel and the other to the feed pipe, the attached rings being capable of movement axially towards each other. The attached rings therefore provide a vacuum tight seal for the connection, and their ability to flex slightly in an axial direction allows the connection to be tightened to hold the refractory linings of the vacuum vessel and the feed pipe tightly together without breaking the vacuum-tight seal.

Preferably the sealing rings are attached to the feed pipe and the vessel, and also to each other, by welding, the welded seams being vacuum tight. It is particularly favourable if the sealing rings are made of sheet metal and are each frustoconical in shape. In the first place this permits the desired freedom of movement in the axial direction and, secondly, an axial spacing is achieved between the edges of the rings which are attached to the vessel and to the feed pipe. This means that the rings can be easily and rapidly secured to the pipe and the vessel as desired, particularly when the sealing rings are welded in position. Preferably the rings are welded at their inner edges to the inner edges of fixing flanges mounted on the feed pipe and the vessel.

Preferably the vessel is provided with a refractory lined lead-in pipe and the flanges are welded to the adjacent end faces of the lead-in and feed pipes the flanges being connected to each other by bolts by which the flanges, and hence the vessel and the feed pipe, can be drawn towards each other to tighten the joint. The refractory linings of each of the lead-in and feed pipes should project beyond the end face of its pipe and attached flange, so that the refractory linings can abut each other while sufficient space is maintained between the flanges for the welded-in seal.

A preferred example of the assembly in accordance with the invention is illustrated in the accompanying drawing which is a radial section through the connection between a vacuum vessel and a feed pipe. The only parts of the vacuum vessel which are shown are its bottom 1 and a short lead-in pipe 2 which is welded to the bottom 1. Both the inside of the bottom 1 and of the lead-in pipe 2 are provided with a refractory lining 3. To the lower end 4 of the lead-in pipe 2 there is welded a radially projecting flange 5 which is clamped by means of nuts and bolts 6 to a similar flange 7 on the feed pipe 8 which is connected to the vacuum vessel. The flange 7 is welded to the end face 9 of the pipe 8 and projects radially from the pipe. The pipe 8 also possesses a refractory lining 11, and this abuts the lining 3 of the lead-in pipe 2 of the vacuum vessel to define the joint plane 12 of the connection between the vessel and the pipe 8.

As can be seen from the drawing, the refractory linings 3 and 11 project axially beyond the pipe end faces 4 and 9 and the flanges 5 and 7, so that there is a space between the adjacent faces of the flanges 5 and 7 to accommodate a vacuum tight seal 13 for sealing the abutting ends of the linings 3 and 11. The seal 13 consists of two frustoconical shaped rings 14 and 15 which are welded at their inner edges to the inner edges of the flanges 5 and 7 respectively, and to each other at their outer edges at 16. These welds are vacuum tight. Thus, the connection between the pipe 8 and the lead-in pipe 2 is vacuum tight, and furthermore the refractory linings 3 and 11 are arranged so they fit so closely to each other in the joint plane 12 so that this joint 12 is not washed out by molten metal which flows into and out of the vessel through the pipes 2 and 8 during operation.

In the present example of refractory linings 3 and 11 each project approximately 10 mm. beyond its flange 5 or 7 respectively in order to provide sufficient space between the flanges 5 and 7 to accommodate the seal 13. The frustoconical rings 14 and 15 which are used to form the seal 13 are made of sheet metal having a thickness between 2 and 4 mms. and are approximately 100 mm wide with an axial depth of 10 mm, although these dimensions may vary with the diameter of the flanges 5 and 7.

In construction of the connection, the ring 14 is welded to the inner edge of the flange 5 on the lead-in pipe 2, and the ring 15 is welded to the inner edge of the flange 7 before the pipe 8 is located below the pipe 2 so that the holes in the flanges 5 and 7 which serve to receive the bolts 6 are aligned and the distance between the flanges 5 and 7 is approximately 20 mm. In this position the ends of the refractory linings 3 and 11 of the pipes 2 and 8 respectively abut each other, and the free outer edges of the rings 14 and 15 also engage each other at 16 where they are autogenously or electrically welded together. After the rings 14, 15 have been welded together to complete the seal 13, the bolts 6 are tightened and any drawing together of the flanges 5 and 7 is accommodated by flexing of the sheet metal rings 14 and 15 forming the seal 13. The bolts 6 need to be tightened up only sufficiently to prevent the suction pipe 8 from sinking after the support apparatus, which is used during construction and is not shown, has been removed, and to ensure that no gap is present between the refractory linings 3 and 11 at the joint 12.

We claim:

1. In a vacuum vessel for metallurgical use, a lead-in pipe connected to the vessel, a refractory lining on the interior of said lead-in pipe, a feed pipe connected to said lead-in pipe, a refractory lining on the interior of said feed pipe, a flange sealingly secured to and extending radially outwardly from each of said lead-in pipe and feed pipe, bolts clamping said flanges together, wherein the improvement comprises a sealed joint securing said lead-in pipe and feed pipe together comprising that said flanges are located on the adjacent ends of said pipes at the joint and means sealing securing said flanges on said ends of said pipes, said refractory lining extending axially outwardly from the adjacent ends of said pipes so that the ends of said refractory linings are in abutting relation and the adjacent ends of said pipes and the facing surfaces of said flanges are in spaced relation, a vacuum tight seal laterally enclosing the abutting end surfaces of said refractory linings and located between the facing surfaces of said flanges, said seal comprising a pair of frustoconically shaped sealing rings each having a radially inner edge and a radially outer edge, one of said sealing rings sealingly welded at its radially inner edge to said flange on said lead-in pipe with its radially outer edge spaced axially from said flange on said lead-in pipe toward and spaced from said flange on said feed pipe, the other one of said sealing rings sealingly welded at its radially inner edge to said flange on said feed pipe with its radially outer edge spaced axially from said flange on said feed pipe toward and spaced from said flange on said lead-in pipe, and the radially outer edges of said sealing rings being sealingly welded together.

2. In a vacuum vessel for metallurgical use, as set forth in claim 1, wherein said sealing rings are each made of sheet metal.

3. In a vacuum vessel for metallurgical use, as set forth in claim 2, wherein said bolts are arranged for drawing said flanges toward each other and said sealing rings being arranged to move toward one another radially inwardly from their sealed outer edges when said flanges are drawn toward one another.

4. In a vacuum vessel for metallurgical use, as set forth in claim 3, wherein said bolts are located radially outwardly from the radially outer edges of said sealing rings and radially inwardly from the radially outer edges of said flanges.

5. In a vacuum vessel for metallurgical use, as set forth in claim 1, wherein said means are welds securing said flanges to the adjacent ends of the said lead-in and feed pipes, respectively, with the radially inner surfaces of said flanges being in contact with the radially outer surfaces of the refractory lining on the respective said pipes so that each said flange extends axially outwardly from the end of said pipe to which it is attached.

* * * * *